(12) United States Patent
Doig et al.

(10) Patent No.: US 10,229,598 B1
(45) Date of Patent: Mar. 12, 2019

(54) METHOD AND APPARATUS FOR VULNERABLE ROAD USER ALERT

(71) Applicant: BlackBerry Limited, Waterloo (CA)

(72) Inventors: Ian Christopher Drummond Doig, Roquefort les Pins (FR); James Randolph Winter Lepp, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/892,707

(22) Filed: Feb. 9, 2018

(51) Int. Cl.
*G08G 1/16* (2006.01)
*G08B 21/02* (2006.01)

(52) U.S. Cl.
CPC ............. *G08G 1/166* (2013.01); *G08B 21/02* (2013.01)

(58) Field of Classification Search
CPC .................................. G01G 1/16; G01G 1/166
USPC .......................... 340/944, 933, 935, 936, 943
See application file for complete search history.

(56) References Cited

U.S. PATENT DOCUMENTS

| | | | | |
|---|---|---|---|---|
| 6,731,202 B1* | 5/2004 | Klaus | ..................... | B60Q 1/525 340/425.5 |
| 8,253,589 B2* | 8/2012 | Grimm | ................. | G01S 5/0072 340/539.1 |
| 9,286,794 B2* | 3/2016 | Duncan | .................. | G08G 1/005 |
| 9,666,076 B2* | 5/2017 | Park | .......................... | G08G 1/16 |
| 9,718,405 B1* | 8/2017 | Englander | ............. | B60Q 9/008 |
| 2005/0073438 A1* | 4/2005 | Rodgers | ................. | G08G 1/161 340/944 |
| 2015/0109148 A1* | 4/2015 | Cheatham, III | ....... | G08G 1/005 340/944 |
| 2015/0332563 A1* | 11/2015 | Davis | ..................... | G08B 5/006 342/66 |
| 2016/0144915 A1* | 5/2016 | Bejestan | .................. | B62J 99/00 340/432 |

\* cited by examiner

*Primary Examiner* — Eric Blount
(74) *Attorney, Agent, or Firm* — Moffat & Co

(57) ABSTRACT

A method at a portable sensor apparatus for detecting an approaching vehicle, the method including detecting, using at least one detector at the sensor apparatus, signal energy of a signal from the approaching vehicle; analyzing the signal energy using a processor at the sensor apparatus to determine that an alarm should be triggered; and based on the analyzing, causing the alarm from an alert mechanism on the sensor apparatus.

19 Claims, 6 Drawing Sheets

METHOD AND APPARATUS FOR VULNERABLE ROAD USER ALERT

FIELD OF THE DISCLOSURE

The present disclosure relates to safety systems and in particular relates to safety systems for vulnerable road users.

BACKGROUND

Intelligent transport systems (ITS) are systems in which a plurality of devices communicate to allow for the transportation system to make better informed decisions with regard to transportation and traffic management, as well as allowing for safer and more coordinated decision-making within a transportation network. ITS system components may be provided within vehicles, as part of fixed infrastructure, such as on bridges or at intersections, and for other users of the transportation systems including pedestrians or bicyclists. ITS system deployment is receiving significant focus in many markets around the world, with frequency bands being allocated for the communications. In addition to vehicle to vehicle (V2V) communications for safety critical and non-safety critical applications, further enhancements are being developed for vehicle to infrastructure (V2I), vehicle to portable personal scenarios (V2P), which collectively may be called referred to as vehicle to everything (V2X).

However, communication components within an ITS system are relatively expensive. In particular, a device generally operating in an ITS system is a specialized communication device having a chipset enabled to communicate with other V2X infrastructure. Vulnerable road user ITS-stations generally have ITS functions including receipt of basic safety messages sent from nearby ITS station vehicles. These ITS stations incorporate both 5.9 GHz (Dedicated Short Range Communications (DSRC), ITS-G5, Long Term Evolution (LTE) PC5 sidelink, LTE network connectivity, and/or 5G (Fifth Generation, also known as NR (New Radio)) cellular) transmitters and receivers with associated competitional processors, displays, among other foreign factors. Such devices are heavy on power usage and are expensive technologies.

BRIEF DESCRIPTION OF THE DRAWINGS

The present disclosure will be better understood with reference to the drawings, in which.

DETAILED DESCRIPTION OF THE DRAWINGS

The present disclosure provides a method at a portable sensor apparatus for detecting an approaching vehicle, the method comprising: detecting, using at least one detector at the sensor apparatus, signal energy of a signal from the approaching vehicle; analyzing the signal energy using a processor at the sensor apparatus to determine that an alarm should be triggered; and based on the analyzing, causing the alarm from an alert mechanism on the sensor apparatus.

The present disclosure further provides a portable sensor apparatus for detecting an approaching vehicle, the portable sensor apparatus comprising: at least one detector; a processor; and an alert mechanism, wherein the portable sensor apparatus is configured to: detect, using the at least one detector, signal energy of a signal from the approaching vehicle; analyze the signal energy using the processor to determine that an alarm should be triggered; and based on the analyzing, causing the alarm from the alert mechanism.

The present disclosure further provides a computer readable medium for storing instruction code, which when executed by a processor on a portable sensor apparatus configured for detecting an approaching vehicle cause the portable sensor apparatus to: detect, using the at least one detector, signal energy of a signal from the approaching vehicle; analyze the signal energy using the processor to determine that an alarm should be triggered; and based on the analyzing, causing the alarm from the alert mechanism.

Therefore, in accordance with the various embodiments of the present disclosure, cheap, low powered alternatives are provided for offering basic safety functionality. Such device may be used for user wearables, bicycles, skateboards, scooters, carts, strollers, among other options. By providing an inexpensive device, users such as families can easily deploy such devices and may own multiple devices in some cases.

Therefore, in accordance with the present disclosure, a low-cost apparatus is provided for sensing approaching vehicles by a vulnerable road user such as a pedestrian or bicyclist.

Figure 1:
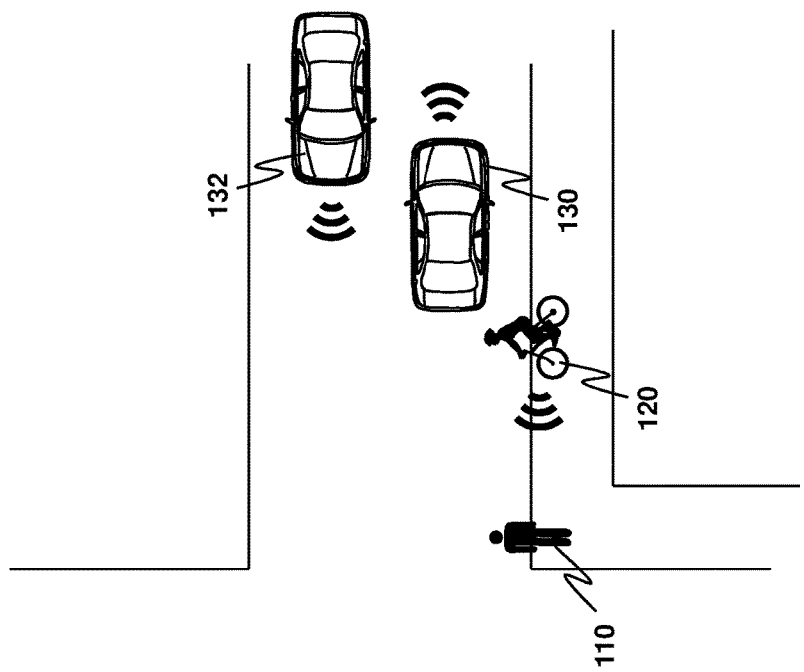
FIG. 1 is a block diagram showing a pedestrian in an intersection.

In particular, reference is made to FIG. 1. In the embodiment of FIG. 1, a pedestrian 110 is approaching an intersection where bicycle 120 and two vehicles, namely vehicles 130 and 132, are in proximity to the intersection. Vehicle 130 is moving away from the intersection while vehicle 132 is approaching the intersection.

In various scenarios, the pedestrian may not notice the bicyclist on the sidewalk. Further, vehicle 130 may block the view of pedestrian 110 of vehicle 132, and therefore the pedestrian may not realize that vehicle 132 is approaching the intersection. Other scenarios are possible.

In accordance with some embodiments of the present disclosure, a pedestrian 110 may have one or more alert devices, which may provide alerts if vehicles are sensed approaching from any direction.

However, in other embodiments the alert device may simply be provided on the back of the pedestrian, for example on the back of the helmet, article of clothing, backpack, among other options. In this case, the sensor may only sense vehicles approaching out of the vulnerable user's direct field of view.

Figure 2:
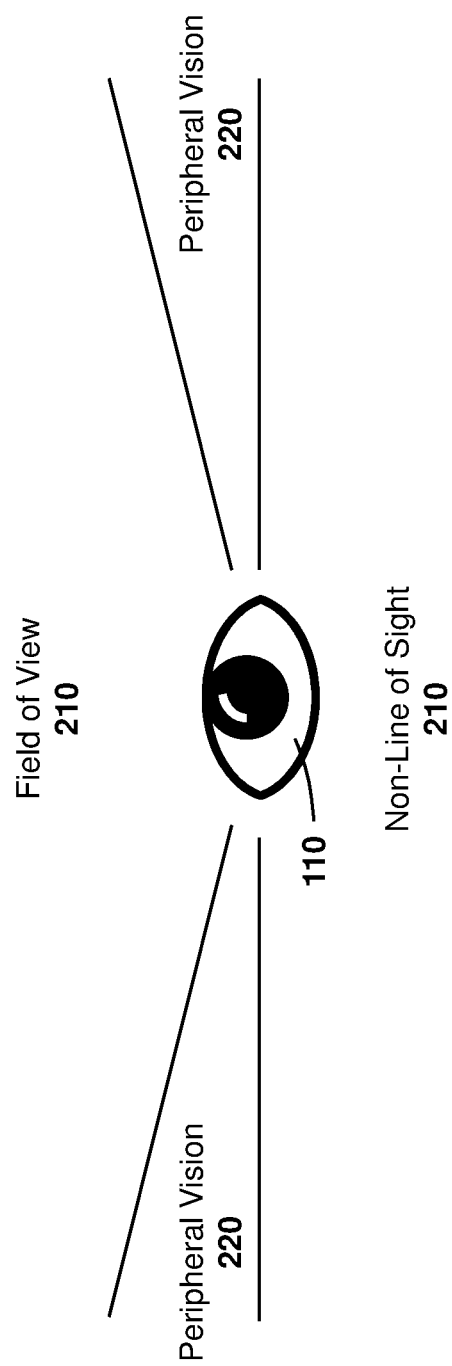
FIG. 2 is a block diagram showing a field of view for a vulnerable road user.

Reference is made to FIG. 2. In the embodiment of FIG. 2, a pedestrian 110 or other vulnerable road user has a direct field of view 210.

Further, the field-of-view of vulnerable pedestrian 110 is enhanced with peripheral vision 220. In such peripheral vision, the user may notice movement of a vehicle.

However, in the non-line of sight region 230, the pedestrian 110 will have no visual knowledge of the approaching vehicle.

Therefore, in accordance with the embodiments of the present disclosure, one or more sensor apparatuses may be located in proximity to the pedestrian or vulnerable road user. In some embodiments, only one device may be used by a user where the device is placed to sense approaching vehicles in the pedestrian's non-line of sight or peripheral vision areas. In other embodiments it may be useful to include multiple devices, for example for vulnerable users that are visually impaired or for children that may not pay attention to traffic, among other options.

The approaching vehicle may be detected in various ways. In the embodiments described below, one example provides for Light Detection And Ranging (LIDAR) sensing in which any LIDAR signal causes an alert. In a further embodiment, the detected LIDAR emissions may be processed to determine the speed and/or heading of an approaching vehicle to determine whether the vulnerable road user is on a collision trajectory. In still a further embodiment, the LIDAR signal may be processed for vehicle velocity to determine whether enhanced alerts should be provided. In still a further embodiment, rather than the LIDAR, various ITS radio signals can be processed to determine whether a vehicle is approaching. These embodiments are described in more detail below.

Vehicle LIDAR Proximity Alarm

Vehicles in the future will generally be LIDAR sensing enabled. LIDAR is a detection system in which a laser beaming signal is transmitted and reflections received.

In this regard, a vulnerable road user sensor apparatus may consist of a LIDAR emission sensor or receiver capable of being worn by the pedestrian or vulnerable road user. For example, the device may be clipped onto clothing or a helmet of a user in some embodiments. In other embodiments, the device may be integrated into helmets or clothing. In still further embodiments, the device may be part of or clipped to devices associated with the user, such as bicycles, strollers, scooters, skateboards, among other options.

The apparatus may consist of directional LIDAR sensing. For example, in one embodiment the sensor may detect signals from an angle of up to 270° relative to the pedestrian.

Figure 3:
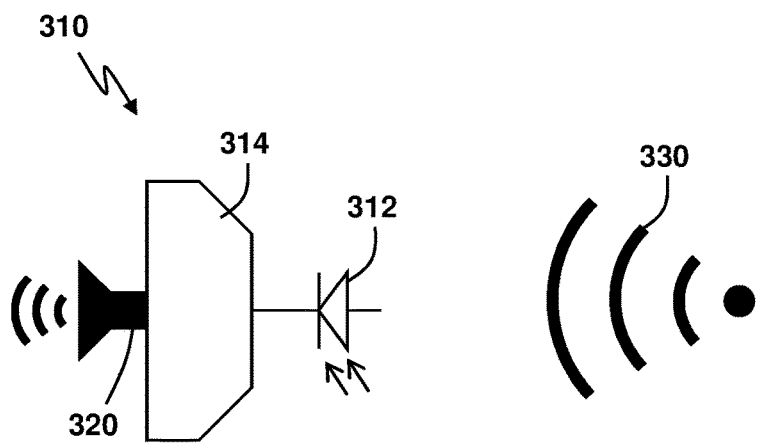
FIG. 3 is a block diagram of a simplified sensor apparatus having a single detector.

Reference is now made to FIG. 3. In the embodiment of FIG. 3, a sensor apparatus 310 comprises a single detector 312, a processor 314, as well as an alarm system 320. Alarm system 320 may be any system that provides an alert to a pedestrian, including audible signals, haptic signals, visual signals, a combination of any audible, visual or haptic signals, among other options.

The sensor apparatus 310 may for example comprise a detector 312 that includes a LIDAR detection diode that would detect light beams at the LIDAR wavelengths. Specifically, the detector detects light at the specific wavelength known to be transmitted by LIDARs. Additionally, the detector may detect not just a single instance of receiving light at that particular wavelength, but also the repeated pulses generated by the LIDAR's scanning pattern. Thus the sensor apparatus may detect both the wavelength of the light and the frequency (period) of the pulses.

Once such detector detects energy from the LIDAR signal 330, a processor 314 could cause the alarm 320 to be activated. In particular, processor 314 can include or interact with a computer readable medium such as memory or other storage medium, whether internal to processor 314 or external to processor 314, to obtain instruction code, which when executed by the processor 314 cause the sensor apparatus to perform the methods described below.

Such a sensor apparatus 310 may be a power limited device. For example, sensor apparatus 310 could be a battery operated device that can be affixed to clothing or portable accessories. Other limited power sources could include any limited power supply, such as a small generator or dynamo, a fuel cell, solar power, energy harvesting, among other options.

External power may allow for recharging of batteries to allow the sensor apparatus 310 to operate in a power limited mode. Recharging methods may also include other power sources, such as, but not limited to, solar, electromagnetic, acoustic or vibration charging.

Thus, in accordance with FIG. 3, the reception of a LIDAR signal from a vehicle approaching the user as detected by sensor apparatus 310 would provide an alarm. For example, if sensor apparatus 310 were positioned to detect signals from outside of the vulnerable road user's field of view, sensor apparatus 310 which would give the vulnerable road user awareness of nearby, but out of field-of-view ITS stations. Therefore, the embodiment of FIG. 3 is a simple, very low power detector and vulnerable road user alerting system.

Directional LIDAR Detection

In a further embodiment, a sensor apparatus may comprise multiple photosensitive detectors operating at the LIDAR light spectrum frequency that would allow calculation of whether a vehicle was on a collision course with the vulnerable road user. Calculation may be performed based on receiving a LIDAR signal continuously on one detector.

Figure 4:
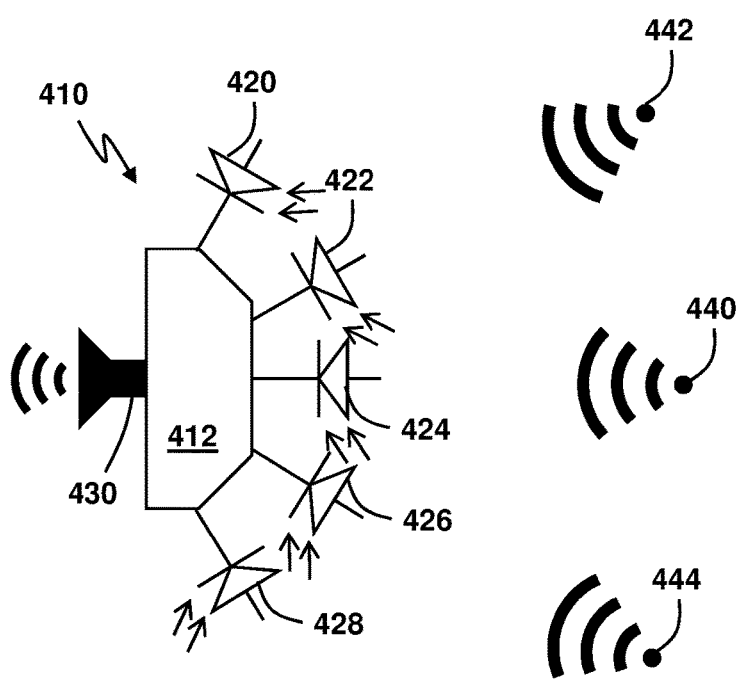
FIG. 4 is a block diagram of a simplified sensor apparatus having multiple detectors.

Reference is now made to FIG. 4. In the embodiment of FIG. 4, and sensor apparatus 410 comprises a processor 412. In particular, processor 412 can include or interact with a computer readable medium such as memory or other storage medium, whether internal to processor 314 or external to processor 412, to obtain instruction code, which when executed by the processor 412 cause the sensor apparatus to perform the methods described below.

Sensor apparatus 410 further includes a plurality of detectors, namely detectors 420, 422, 424, 426 and 428. However, the number of detectors on sensor apparatus 410 is not restricted to the embodiment of FIG. 4 and in practical embodiments, more or fewer detectors could be provided on sensor apparatus 410.

Sensor apparatus 410 further includes an alarm 430, which may be any audible, visual, haptic, or combination alert system.

Using the plurality of the detectors, sensor apparatus 410 could determine whether a vehicle is approaching the vulnerable road user, or is travelling in a different direction. For example, if a particular detector, such as a detector 424, detects the energy of LIDAR signal 440 from a vehicle for greater than a threshold time period, this would indicate that the vehicle is approaching the vulnerable road user directly from that direction and therefore that the alarm should be triggered. Conversely, if the LIDAR signal is first detected by detector 422 and then detector 424 and then detector 426 and then detector 428, this would indicate that the vehicle is passing the pedestrian at an angle that is not a collision course and that therefore that an alarm does not need to be raised.

Similarly, if detector 422 detects the energy of LIDAR signal 442 for greater than a threshold period, or if detector 426 detects the energy of LIDAR signal 444 for greater than a threshold period, such detection could indicate a potential collision and a need to activate an alarm.

Figure 5:
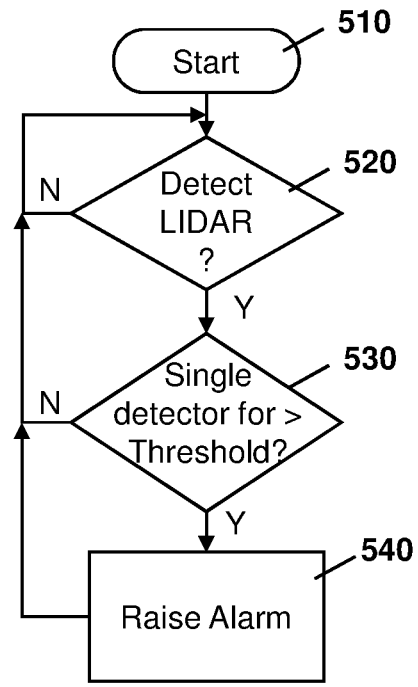
FIG. 5 is a process diagram showing a process for determining whether a LIDAR source is heading towards the sensor apparatus.

Reference is now made to FIG. 5, which shows a process for detecting whether a vehicle is approaching the vulnerable road user. The process of FIG. 5 starts at block 510 and proceeds to block 520 in which a check is made whether the alert device has detected a LIDAR signal. If not, the process continues to loop at block 520.

Once a LIDAR signal is detected, the process proceeds to block 530 in which a check is made to determine whether a single detector at the sensor apparatus has detected the LIDAR signal for greater than a threshold time period. If not, the process continues to loop back to block 520 to continue to check for such LIDAR signals.

However, if a single detector has detected a LIDAR signal for greater than a threshold time period, then the process proceeds to block 540 in which an alarm is raised. Again, such alarm may be audible, visual, haptic, or a combination of the above.

The process then proceeds back to block 520 to continue to check for detected LIDAR signals.

In some embodiment, the threshold time period at block 530 may be varied depending on which detector is detecting the LIDAR signal. For example, a LIDAR detector that is positioned directly rearward may detect a LIDAR signal longer than a detector that detects at an angle. In this case, the threshold for such rearward facing detector may be longer than an angled detector to better determine whether the vehicle is on a collision course. Other options are possible.

In other embodiments, the threshold time period may be equal for all detectors.

Further, in some embodiments, the alarm at block 540 may be varied depending on the amount of time that a detector has been detecting a LIDAR signal. For example, an original alarm may simply be a ping to provide a pedestrian or vulnerable road user with an alert that a vehicle is approaching. However, if the signal continues to be detected this may indicate that a collision is imminent and that therefore the alarm may be more urgent, such as a louder alarm, or alarm that includes audio plus haptic feedback, among other options.

LIDAR Beam Power Measurement

In still a further embodiment, the intensity or power level of the received LIDAR signal may be utilized to determine whether a collision is imminent. In particular, LIDAR transmit power is calibrated. While the primary measurement of the LIDAR is time of flight, which is independent of power, a secondary measurement is the intensity of the received reflection. In this regard, LIDAR systems typically have highly calibrated laser transmit power.

Therefore, assuming that the laser transmit intensity or power is consistent over a short amount of time, the received laser intensity can therefore be used in calculating whether the LIDAR transmitting object, such as a vehicle, is moving closer or moving away from the sensor apparatus on the vulnerable road user.

Figure 6:
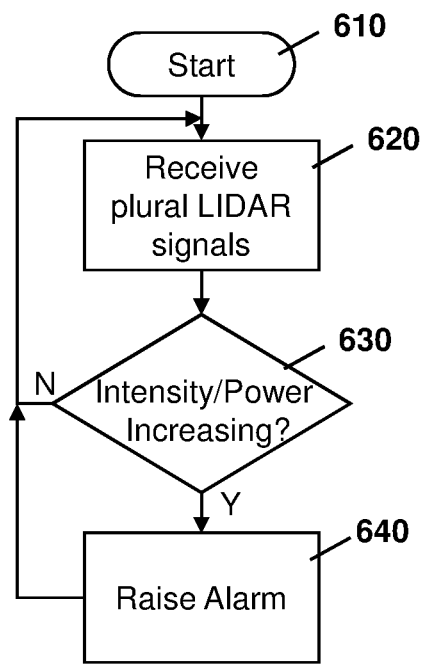
FIG. 6 is a process diagram showing a process for determining whether a LIDAR source is increasing in power or intensity.

In particular, reference is now made to FIG. 6, which shows a process for determining whether the source of the LIDAR energy is getter closer to the vulnerable road user. The process of FIG. 6 starts a block 610 and proceeds to block 620. At block 620, the sensor apparatus receives a plurality of LIDAR signals. For example, such LIDAR signals may be received over a threshold time period.

From block 620, the process proceeds to block 630 in which a check is made to determine whether the intensity or power of the received LIDAR signals is increasing or decreasing. In particular, if the intensity or power is not increased, this would indicate that the vehicle is not moving towards the sensor apparatus and the vulnerable road user. In this case, the process may proceed back to block 620 to continue to receive LIDAR signals.

Conversely, if it is determined at block 630 that the intensity or power is increasing, this indicates that the source of the LIDAR energy is moving closer to the vulnerable road user, and the process may proceed to block 640 in which the alarm can be raised. As with the above embodiments, the alarm may be auditory, haptic, visual, or a combination thereof, among other options.

Doppler Shift

In still a further embodiment, a sensor apparatus may analyze the received LIDAR signal for doppler shift to estimate approaching vehicle speed. In particular, automotive LIDARs tend to be in the 905 nm wavelength range, with some research being done at the 1550 nm range. In this regard, the wavelength of the LIDAR is known to the sensor apparatus.

Therefore, the detector could detect the wavelength received at the sensor apparatus. A doppler shift could indicate that the vehicle is approaching the vulnerable road user or moving away from the vulnerable road user. Further, the doppler shift could indicate the velocity of the approaching LIDAR source.

Figure 7:
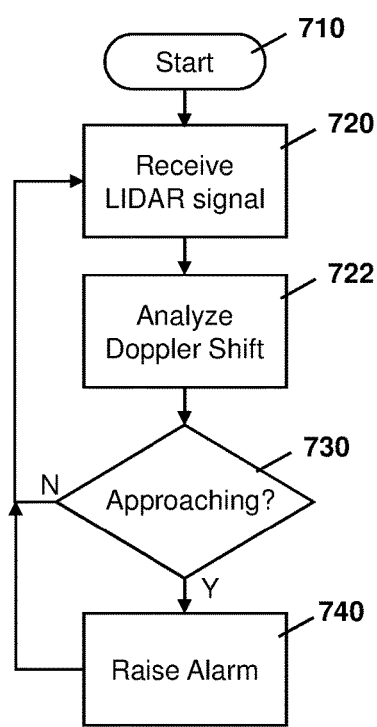
FIG. 7 is a process diagram showing a process for raising an alarm based on an analysis of a doppler shift in a detected LIDAR source.

Reference is now made to FIG. 7. The process of FIG. 7 starts at block 710 and proceeds to block 720 in which the LIDAR signal is received.

The process then proceeds to block 722 in which the doppler shift for the received signal is analyzed.

From block 722, the process proceeds to block 730 in which a check is made to determine whether the LIDAR source is approaching the sensor apparatus. If yes, the process proceeds to block 740 in which an alarm is raised. The alarm raised at block 740 could, in some cases, vary in intensity based on the approaching speed of the vehicle. Therefore, the various indications such as audio, haptic or visual may be provided at various levels depending on the approach of the vehicle.

Conversely, from block 730, if the vehicle is not approaching the sensor apparatus, then the process may proceed back to block 720 in which signals continue to be monitored.

From block 740, the process may also proceed back to block 720 in which further signals are monitored.

Radiofrequency Energy Analysis

In still a further embodiment, rather than utilizing a LIDAR detector, in some cases a radio frequency and energy detector could be utilized to determine an approaching vehicle.

In particular, Intelligence Transport System vehicles will typically be equipped with transmitters for ITS communications. For example, in some cases, a 5.9 GHz radio transmitter transmitting DSRC, ITS-G5, or LTE PC5 signals, among others, could be utilized by vehicles that are part of the ITS system.

In this case, detector 312 or detectors 420, 422, 424, 426 and 428 may be radiofrequency energy detectors rather than LIDAR energy detectors.

The embodiments of FIGS. 5 to 7 could similarly be utilized, but using radiofrequency signals rather than the LIDAR signals. In particular, the sensor or receiver apparatus may trigger an alert, such as an audible, haptic, visual or combination alert, on reception of a radio frequency signal from a moving ITS vehicle. Therefore, this embodiment gives the vulnerable road user awareness of nearby, but out of line sight ITS stations.

The alert would work within the range of transmission of the 5.9 GHz radio transmitter (or whatever radiofrequency bands are utilized for ITS solutions). For example, in one embodiment, a 5.9 GHz radio may have a working range of 350 m.

Figure 8:
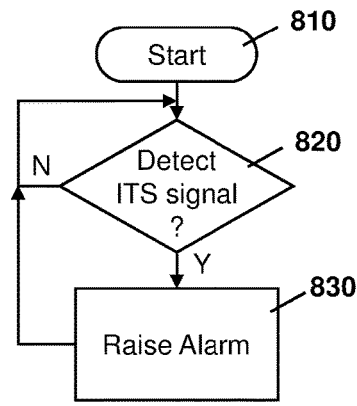
FIG. 8 is a process diagram showing a process for raising an alarm based on detection of an ITS radiofrequency signal.

Thus, reference is now made to FIG. 8. The process of FIG. 8 starts at block 810 and proceeds to block 820 in which a check is made to determine where the sensor apparatus detects a ITS RF signal.

If yes, then the process proceeds to block 830 in which an alarm may be raised.

Figure 9:
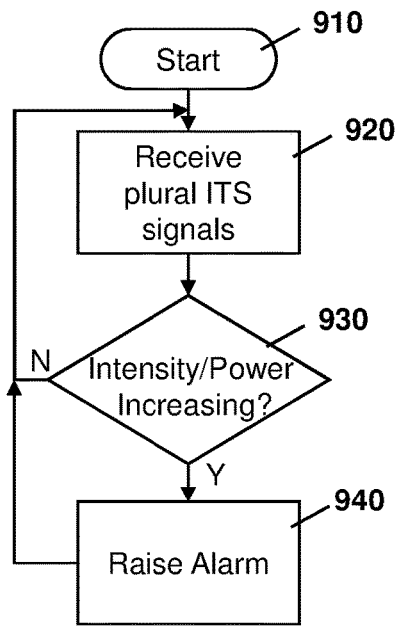
FIG. 9 is a process diagram showing a process for raising an alarm based on detection of an increase in intensity or power of an ITS radiofrequency signal.

Similarly, reference is made to FIG. 9. In the embodiment of FIG. 9, the process starts at block 910 and proceeds to block 920 in ITS RF signals are detected for a time period.

The process proceeds to block 930 in which a check is made to determine whether the intensity or power of the RF energy is increasing. Specifically, DSRC radio is transmitted at a constant power level. Thus a receiver could detect if the intensity or power detected is increasing or decreasing. If no then the process may proceed back to block 920.

Conversely, from block 930, if the power or intensity is increasing, the process may proceed to block 940 in which an alarm is raised.

Once the alarm is raised, the process may then proceed back to block 920 to check for further ITS RF signals.

Figure 10:
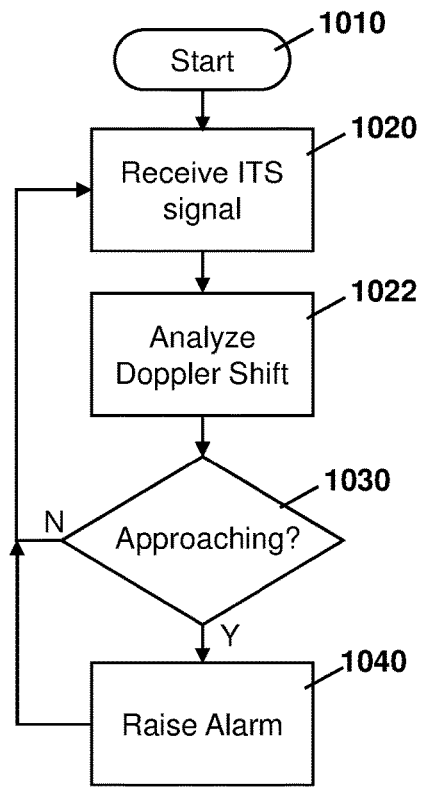
FIG. 10 is a process diagram showing a process for raising an alarm based on an analysis of a doppler shift in a detected ITS radiofrequency signal.

Similarly, reference is made to FIG. 10 in which the process starts at block 1010 and proceeds to block 1020 in which a RF signal is received within the ITS spectrum.

From block 1020, the process proceeds to block 1022 in which the doppler shift for the signal is analyzed.

From block 1022 the process proceeds to block 1030 in which a determination is made on whether the ITS RF source is moving towards the vulnerable road user. If no then the process proceeds back to block 1020.

Conversely, if the RF source is moving towards the vulnerable road user, then the process proceeds from block 1030 to block 1040 in which an alarm is raised. As with the alarm at block 740 above, the intensity of the alarm may vary depending on the speed of the approaching ITS RF source.

The embodiments of FIGS. 4 to 10 can, in some cases, be combined to provide a sensor apparatus having various capabilities. Thus, for example, both intensity and doppler shift may be used to make a determination on whether a LIDAR or ITS RF source is approaching a vulnerable road user. In other cases, both RF signals and LIDAR signals may be used to make a determination on whether an alarm should be raised. Thus, the present disclosure is not limited to any one embodiment, and in some cases the embodiments may be combined.

The above solutions therefore offer basic safety warnings to vulnerable road users where the sensor apparatus may have a long battery life.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a portable sensor apparatus, the method comprising:
   detecting, using at least one detector at the sensor apparatus, signal energy of a signal from an approaching vehicle;
   analyzing the signal energy using a processor at the sensor apparatus to determine that an alarm should be triggered; and
   based on the analyzing, causing the alarm from an alert mechanism on the sensor apparatus;
   wherein the sensor apparatus comprises a plurality of detectors, the analyzing comprising determining that the approaching vehicle bis on a collision course with the sensor apparatus when the signal energy is received by one of the plurality of detectors for greater than a threshold time period.

2. The method of claim 1, wherein the analyzing comprises triggering the alarm upon detection of the signal energy.

3. The method of claim 1, wherein the analyzing comprises determining the approaching vehicle speed based on a doppler shift in the signal.

4. The method of claim 3, wherein the alarm varies based on the approaching vehicle speed.

5. The method of claim 1, wherein the analyzing comprises determining a distance for the approaching vehicle based on power or intensity of the signal energy.

6. The method of claim 5, wherein the alarm varies based on the approaching vehicle distance.

7. The method of claim 1, wherein the signal is a LIDAR signal.

8. The method of claim 1, wherein the signal is an Intelligent Transportation Signal from a vehicle.

9. The method of claim 1, wherein the alarm is one or more of a visual alarm, audible alarm, or a haptic alarm.

10. A portable sensor apparatus, the portable sensor apparatus comprising:
    at least one detector;
    a processor; and
    an alert mechanism,
    wherein the portable sensor apparatus is configured to:
    detect, using the at least one detector, signal energy of a signal from an approaching vehicle;
    analyze the signal energy using the processor to determine that an alarm should be triggered; and
    based on the analyzing, causing the alarm from the alert mechanism;
    wherein the sensor apparatus comprises a plurality of detectors, and wherein the portable sensor apparatus is configured to analyze by determining that the approaching vehicle is on a collision course with the sensor apparatus when the signal energy is received by one of the plurality of detectors for greater than a threshold time period.

11. The portable sensor apparatus of claim 10, wherein the portable sensor apparatus is configured to analyze by triggering the alarm upon detection of the signal energy.

12. The portable sensor apparatus of claim 10, wherein the portable sensor apparatus is configured to analyze by determining the approaching vehicle speed based on a doppler shift in the signal.

13. The portable sensor apparatus of claim 12, wherein the alarm varies based on the approaching vehicle speed.

14. The portable sensor apparatus of claim 10, wherein the portable sensor apparatus is configured to analyze by determining a distance for the approaching vehicle based on power or intensity of the signal energy.

15. The portable sensor apparatus of claim 14, wherein the alarm varies based on the approaching vehicle distance.

16. The portable sensor apparatus of claim 10, wherein the signal is a LIDAR signal.

17. The portable sensor apparatus of claim 10, wherein the signal is an Intelligent Transportation Signal from a vehicle.

18. The portable sensor apparatus of claim 10, wherein the alarm is one or more of a visual alarm, audible alarm, or a haptic alarm.

19. A computer readable medium for storing instruction code, which when executed by a processor on a portable sensor apparatus configured for detecting an approaching vehicle cause the portable sensor apparatus to:
    detect, using the at least one detector, signal energy of a signal from the approaching vehicle;
    analyze the signal energy using the processor to determine that an alarm should be triggered; and
    based on the analyzing, causing the alarm from the alert mechanism;
    wherein the sensor apparatus comprises a plurality of detectors, and wherein the portable sensor apparatus is configured to analyze by determining that the approaching vehicle is on a collision course with the sensor apparatus when the signal energy is received by one of the plurality of detectors for greater than a threshold time period.

* * * * *

UNITED STATES PATENT AND TRADEMARK OFFICE
CERTIFICATE OF CORRECTION

PATENT NO. : 10,229,598 B1
APPLICATION NO. : 15/892707
DATED : March 12, 2019
INVENTOR(S) : Ian Christopher Drummond Doig and James Randolph Winter Lepp It is certified that error appears in the above-identified patent and that said Letters Patent is hereby corrected as shown below:

In the Claims

Column 9, Line 38 Claim 1 includes the phrase "vehicle bis on a collision course". This phrase should read "vehicle is on a collision course".

Signed and Sealed this
Twenty-second Day of October, 2019

Andrei Iancu
*Director of the United States Patent and Trademark Office*